(12) United States Patent
Tanji

(10) Patent No.: US 9,008,407 B2
(45) Date of Patent: Apr. 14, 2015

(54) NOISE REDUCTION PROCESSING METHOD AND APPARATUS FOR A BIOLOGICAL TISSUE IMAGE

(71) Applicant: Canon Kabushiki Kaisha, Tokyo (JP)

(72) Inventor: Koichi Tanji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/746,465

(22) Filed: Jan. 22, 2013

(65) Prior Publication Data

US 2013/0195327 A1  Aug. 1, 2013

(30) Foreign Application Priority Data

Jan. 30, 2012 (JP) ................. 2012-016429
Jan. 16, 2013 (JP) ................. 2013-005347

(51) Int. Cl.
  *G06K 9/00*  (2006.01)
  *G06T 5/00*  (2006.01)
  *G06T 5/10*  (2006.01)

(52) U.S. Cl.
  CPC . *G06T 5/002* (2013.01); *G06T 5/10* (2013.01); *G06T 2207/10056* (2013.01); *G06T 2207/20048* (2013.01); *G06T 2207/20081* (2013.01); *G06T 2207/30024* (2013.01)

(58) Field of Classification Search
  USPC .............. 382/100, 128–134, 254, 260–275; 250/316.1, 227.23, 336.1, 339.05, 250/227.18; 348/33, 79; 435/40.5
  See application file for complete search history.

(56) References Cited

U.S. PATENT DOCUMENTS

| | | | | |
|---|---|---|---|---|
| 5,991,028 A * | 11/1999 | Cabib et al. | ................. | 356/456 |
| 6,081,612 A * | 6/2000 | Gutkowicz-Krusin et al. | ................. | 382/128 |
| 7,329,852 B2 * | 2/2008 | Liu | ................. | 250/214.1 |
| 7,562,057 B2 * | 7/2009 | Maggioni et al. | ................. | 706/20 |
| 8,165,661 B2 * | 4/2012 | Koski et al. | ................. | 600/473 |
| 8,385,615 B2 * | 2/2013 | Levenson et al. | ................. | 382/128 |
| 2007/0189635 A1 | 8/2007 | Borsdorf et al. | ................. | 382/275 |
| 2009/0136104 A1 * | 5/2009 | Hajian et al. | ................. | 382/128 |
| 2011/0228970 A1 * | 9/2011 | Kajihara et al. | ................. | 382/100 |
| 2012/0082362 A1 * | 4/2012 | Diem et al. | ................. | 382/133 |
| 2012/0328178 A1 * | 12/2012 | Remiszewski et al. | ................. | 382/133 |
| 2013/0195328 A1 | 8/2013 | Tanji | | |

FOREIGN PATENT DOCUMENTS

| | | |
|---|---|---|
| JP | 2007-209755 | 8/2007 |
| JP | 2010-071953 | 4/2010 |
| JP | 2010-085219 | 4/2010 |

OTHER PUBLICATIONS

S.G. Nikolov et al., "De-Noising of SIMS Images Via Wavelet Shrinkage," *Chemometrics and Intelligent Laboratory Systems*, vol. 34, p. 263-273 (1996).

* cited by examiner

*Primary Examiner* — Anand Bhatnagar
(74) *Attorney, Agent, or Firm* — Fitzpatrick, Cella, Harper & Scinto

(57) ABSTRACT

Noise reduction processing for measured spectrum data is performed without any information loss due to discrete data characteristics of the measured spectrum data. Optical spectra in one or more cross-sections are measured through use of a signal correlated with a substance distributed in a biological tissue, and a biological tissue image having reduced noise is reconstructed from the spectra.

8 Claims, 8 Drawing Sheets

NOISE REDUCTION PROCESSING METHOD AND APPARATUS FOR A BIOLOGICAL TISSUE IMAGE

BACKGROUND OF THE INVENTION

1. Field of the Invention

The present invention relates to a noise reduction processing method for a biological tissue image and an apparatus therefor. Specifically, the present invention relates to a method and apparatus for reconstructing a biological tissue image having reduced noise components from measured spectrum data of a biological tissue. The present invention also relates to an image display for clearly displaying a diseased site in pathological diagnosis through use of the thus acquired biological tissue image.

2. Description of the Related Art

There has been performed pathological diagnosis, that is, observing a biological tissue with a microscope or the like and diagnosing the presence or absence of a lesion and a type of the lesion based on the observation. The pathological diagnosis requires visualization of a constituent substance or contained substance correlated with a biological tissue to be observed. A technique for staining a specific antigen protein through use of an immunostaining method has mainly been employed in the pathological diagnosis. When breast cancer is taken as an example, an estrogen receptor (ER) (serving as a judgment criterion for a hormone therapy), which is expressed in a hormone-dependent tumor, and a membrane protein HER2 (serving as a judgment criterion for Herceptin administration), which is found in a fast-growing malignant cancer, are visualized by the immunostaining method. However, the immunostaining method involves problems that its reproducibility is poor because an antibody is unstable and antigen-antibody reaction efficiency is difficult to control. Further, in the future, when there is an increasing need for such functional diagnosis, for example, when there arises a need for detection of several tens or more kinds of constituent substances or contained substances, currently-employed immunostaining methods cannot meet the need any more.

Further, in some cases, the visualization of the constituent substance or contained substance may be required at a cellular level, not at a tissue level. For example, in research on cancer stem cells, it was revealed that a tumor was formed in only part of fractions of a tumor tissue after xenotransplantation to immunocompromised mice. Therefore, it is being understood that growth of a tumor tissue, in which cancer stem cells are recognized, depends on differentiation and self-renewal abilities of the cancer stem cells. In such research, it is necessary to observe an expression distribution of a constituent substance or contained substance in an individual cell in a tissue, not the entire tissue.

As described above, in the pathological diagnosis, a constituent substance or contained substance correlated with a tumor tissue or the like is required to be exhaustively visualized at a cellular level. There are given, as candidates of a method for the visualization, secondary ion mass spectrometry (SIMS), such as time-of-flight secondary ion mass spectrometry (TOF-SIMS), and Raman spectroscopy. In measurement by the SIMS or Raman spectroscopy, information at each point (region) in a space can be obtained with a high spatial resolution. That is, spatial distribution information on each peak value for a measured spectrum correlated with an object to be measured is obtained. Consequently, a spatial distribution of a substance in a biological tissue correlated with the measured spectrum can be determined.

The SIMS is a method involving irradiating a sample with a primary ion beam, and detecting a secondary ion emitted from the sample, thereby obtaining a mass spectrum at each point on the sample. For example, in TOF-SIMS, through utilization of the fact that a time-of-flight of a secondary ion depends on a mass m and charge z of the ion, the secondary ion is identified, and thereby a mass spectrum at each point on a sample can be obtained.

The Raman spectroscopy involves acquiring a Raman spectrum by irradiating a substance with a laser beam, which is monochromatic light, as a light source, and detecting the generated Raman scattered light with a spectrometer or an interferometer. A difference (Raman shift) between a frequency of the Raman scattered light and a frequency of incident light has a value peculiar to a structure of a substance. Hence, a Raman spectrum specific for an object to be measured can be acquired.

As used herein, the "cellular level" means a level at which at least an individual cell can be identified. A diameter of the cell falls within a range of approximately 10 µm to 20 µm (except that a large cell such as a nerve cell has a diameter of about 50 µm). Thus, in order to acquire a two-dimensional distribution image at a cellular level, the spatial resolution needs to be 10 µm or less, preferably 5 µm or less, more preferably 2 µm or less, still more preferably 1 µm or less. The spatial resolution may be determined from, for example, results of linear analysis of a knife-edge sample. That is, the spatial resolution is determined based on the following general definition: "a distance between two points at which signal intensities attributed to a substance of interest near the boundary of a sample are 20% and 80%, respectively."

In order to acquire biological information from measured spectrum, for example, it is necessary to generate a classifier by machine learning in advance and to apply the classifier to measured spectrum data of a sample (Japanese Patent Application Laid-Open No. 2010-71953). However, when its signal intensity is low, it is impossible to disregard influences of noise components on the classification processing. Hence, it is necessary to appropriately reduce noise components each having a low correlation with an original signal of a biological tissue. As used herein, machine learning refers to a technique involving empirically learning previously acquired data, and interpreting newly acquired data based on the learning results. The classifier refers to judgment criterion information to be generated by empirically learning a relationship between previously acquired data and biological information.

Various noise reduction techniques are known. Japanese Patent Application Laid-Open No. 2007-209755 proposes a technique for reducing noise effectively by analyzing two or more two-dimensional images through use of wavelet analysis, and considering a correlation between both the images. S. G. Nikolov et al., "De-noising of SIMS images via wavelet shrinkage," Chemometrics and Intelligent Laboratory Systems, vol. 34 (1996), p. 263-273 proposes a noise reduction technique in consideration of a probability process (Gauss or Poisson process) involving using two-dimensional wavelet analysis for an SIMS image.

SUMMARY OF THE INVENTION

In noise reduction processing having applied thereto Fourier analysis or wavelet analysis, an image having reduced noise has been obtained by specifying a basis function, removing subthreshold components, and performing inverse transform. However, spectrum data has a discrete distribution having a large number of peak values. Hence, when a trigonometric function is used as in the Fourier analysis, an original signal component may be removed. Even in the case of using the wavelet analysis, there is a problem in that noise components are not appropriately removed unless an appropriate basis function is selected.

In view of the foregoing, the present invention utilizes, in the case of, for example, measuring a biological tissue, the fact that spectrum data information based on the total sum of spectra specific for an object to be measured is obtained. That is, spectrum data obtained by measurement, when expressed through use of the sum of typical spectra specific for an object to be measured, can be divided into the sum of spectra characteristic of the object to be measured and noise components except the spectra (hereinafter, the spectra are referred to as "typical specific spectra"). Thus, an image having reduced noise can be acquired by removing the noise components and reconstructing spectrum signals through use of typical specific spectra derived from a biological tissue (hereinafter, the procedure is referred to as "image reconstruction").

According to the present invention, there is provided a method of acquiring a biological tissue image, including measuring spectra having a spatial distribution of a biological tissue and acquiring a biological tissue image having reduced noise from the measured spectra, in which the reduction of the noise is performed through use of reference data for the spectrum data.

According to the present invention, further, there is provided an apparatus for acquiring a biological tissue image, the apparatus being configured to measure spectra having a spatial distribution of a biological tissue and acquire a biological tissue image having reduced noise from the measured spectra, in which the reduction of the noise is performed through use of reference data for the spectrum data.

According to the present invention, it is possible to perform noise reduction processing for spectrum data without causing any information loss due to discrete data characteristics of the spectrum data. Consequently, classification of a biological tissue is enabled with higher accuracy than ever before, and hence the present invention is useful for an application to pathological diagnosis or the like.

Further features of the present invention will become apparent from the following description of exemplary embodiments with reference to the attached drawings.

DESCRIPTION OF THE EMBODIMENTS

The present invention is characterized in that, in measuring spectra having a spatial distribution of a biological tissue and reconstructing a biological tissue image having reduced noise from the measured spectra, the reduction of the noise is performed through use of reference data for the spectrum data. In the present invention, the reference data can be generated through utilization of training data. In addition, in the present invention, the reduction of the noise can be performed by generating a classifier through utilization of the training data, dividing an entire spectrum into typical specific spectra through use of the classifier, and reconstructing an image from the typical specific spectra derived from the biological tissue.

The measured spectra can be, but not limited to, optical spectrum in a range of ultraviolet, visible or infrared light, raman spectrum and mass spectrum, etc.

In an embodiment of the present invention, when a two-dimensional mass spectrum of a biological tissue section is measured by mass spectrometry using a primary probe selected from the group consisting of an ion, an electron, a neutral particle, and a laser beam, and a biological tissue image having reduced noise is acquired from the two-dimensional mass spectrum, the reduction of the noise is performed through use of reference data for the mass spectrum.

Hereinafter, embodiments of the present invention are specifically described with reference to the flowcharts and other drawings. It should be noted that the following specific example is an example of the best embodiment according to the present invention, but the present invention is by no means limited to any such specific embodiment. The present invention, which includes measuring a sample having a composition distribution in a space, is applicable to results obtained by any measurement method as long as positional information at each point (region) in the space and measured spectrum information corresponding to the position of each point are obtained. The space can be, but not limited to, respective regions of a biological tissue.

Figures 2A, 2B:
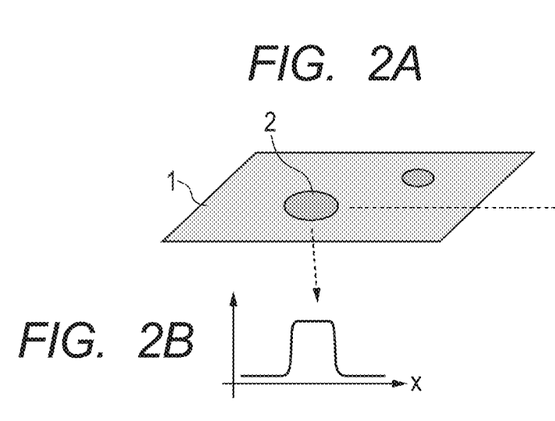
FIGS. 2A, 2B, and 2C are schematic diagrams of spectrum signals having an intensity distribution in a two-dimensional plane.
Figure 2C:
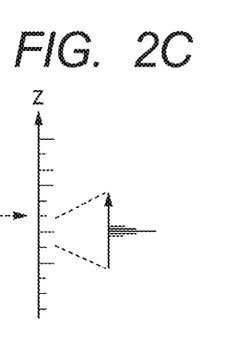

FIG. 2A, FIG. 2B, and FIG. 2C illustrate schematic diagrams of measured spectra measured at each point on a space. For example, when the two-dimensional plane of FIG. 2A is considered as a space in which signals are acquired, information to be obtained is three-dimensional data. When each point in a three-dimensional space in generating the three-dimensional data is expressed by coordinates (X, Y, Z), the components X and Y are coordinates on a two-dimensional space (XY plane), in which measured spectrum signals have been obtained, as exemplarily illustrated in FIG. 2B for the component X. The component Z is a measured spectrum signal at each point on the XY plane, as illustrated in FIG. 2C. Thus, the components X and Y contain the X-coordinate and Y-coordinate of the point where a signal has been measured, respectively, and the component Z contains a value for a measured signal corresponding to the intensity of each peak component.

Figure 3:
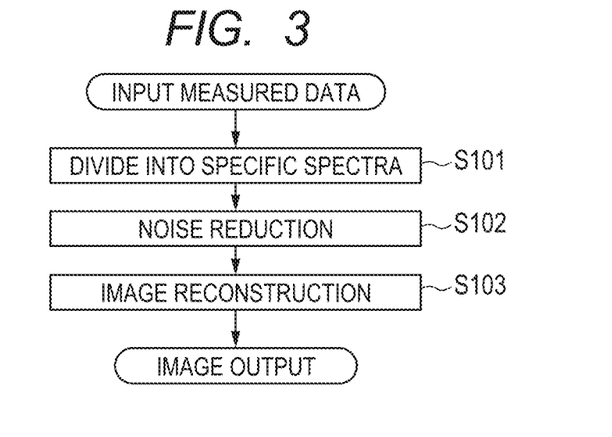
FIG. 3 is a flowchart of the present invention.

FIG. 3 illustrates a flowchart of noise reduction processing in the present invention. The following description is made with reference to the drawing according to the order in the flowchart.

Figure 4:
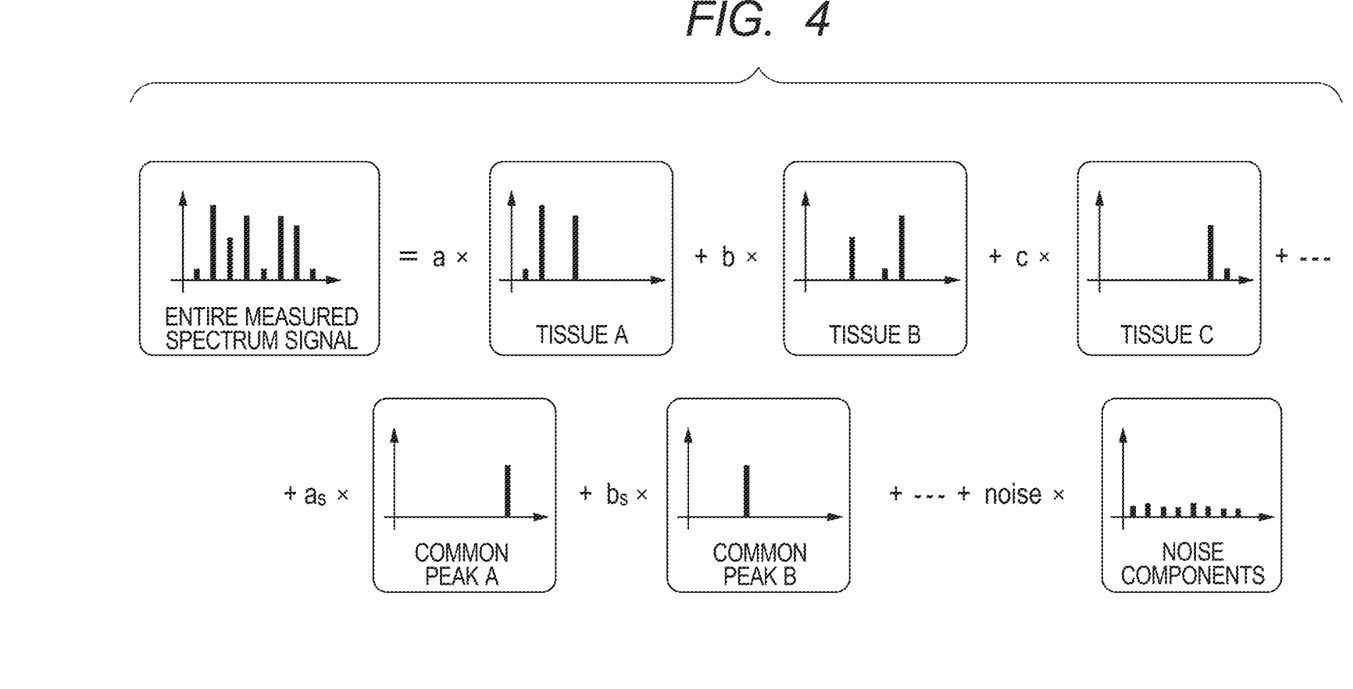
FIG. 4 schematically illustrates the division of measured signals into respective specific spectra.

In Step S101 of FIG. 3, measured spectrum data is divided into typical specific spectra (Expression 1). As used herein, the typical specific spectra refer to spectra specific for respective components constituting the entire spectrum. In order to determine the typical specific spectra, for example, a correlation (inner product) between each spectrum component prepared in advance and measured spectrum data has only to be calculated. Otherwise, the typical specific spectra may be determined through utilization of training data or the like. FIG. 4 schematically illustrates the division of measured signals into respective spectrum components. As used herein, the training data means data acquired before the acquisition of new data.

Measured data=$a$×Specific spectrum $A$+$b$×Specific spectrum $B$+$c$×Specific spectrum $C$+ . . . +$a_s$× Common peak $A$+$b_s$×Common peak $B$+ . . . +$n$×noise components        Expression (1)

Figure 5:
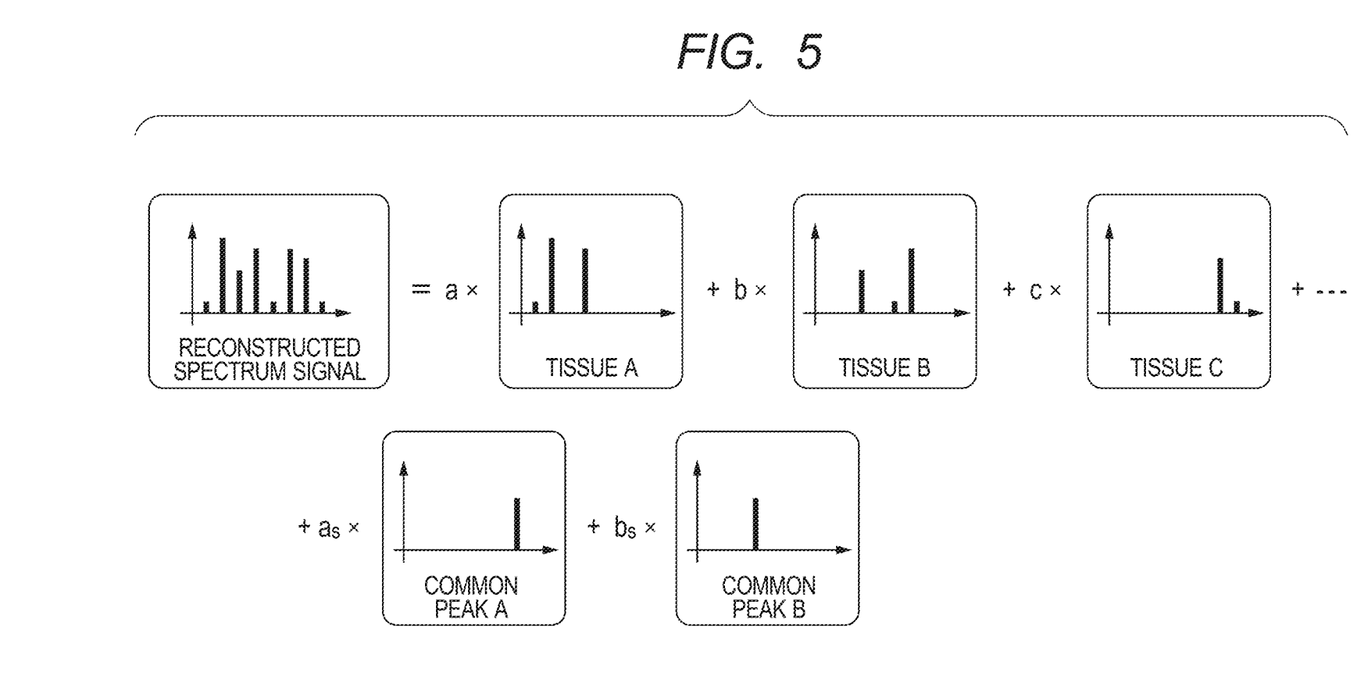
FIG. 5 schematically illustrates the reconstruction of signals having noise components removed therefrom.

In Step S102 of FIG. 3, a component except typical specific spectrum components derived from a biological tissue is set to zero. Next, in Step S103, a biological tissue image having reduced noise is acquired by reconstructing signals through use of the typical specific spectrum components derived from the biological tissue (Expression 2). FIG. 5 schematically illustrates the reconstruction of the signals.

Measured data=$a$×Specific spectrum $A$+$b$×Specific spectrum $B$+$c$×Specific spectrum $C$+ . . . +$a_s$× Common peak $A$+$b_s$×Common peak $B$+        Expression (2)

Figure 6:
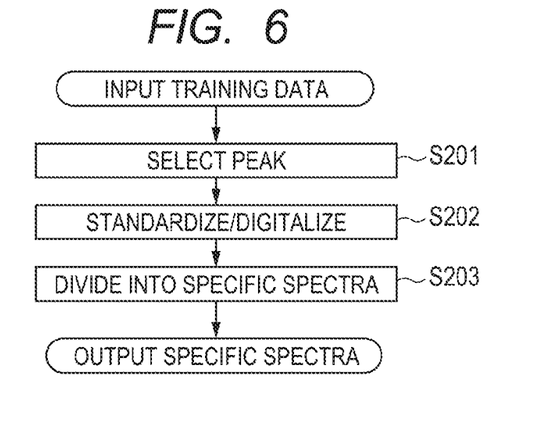
FIG. 6 is a flowchart of a process for dividing the entire spectrum into typical specific spectra.

FIG. 6 illustrates an example of a flowchart for determining typical specific spectra through use of training data. The following description is made with reference to the drawing according to the order in the flowchart.

In Step S201 of FIG. 6, a peak to be used for determining typical specific spectra is selected. Next, in Step S202, the data is standardized and digitalized. In Step S203, the standardized and digitalized data is divided into typical specific spectra by, for example, machine learning. In this step, for example, an appearance frequency can be counted or the inside of a feature space can be divided into regions of respective specific spectra. As used herein, the feature space refers to a space in which a feature value is projected in order to classify the attribute of data, and the feature value refers to a value suitable for classification to be generated from original data. In this case, a standardized peak intensity or the like can be considered as the feature value. There may be employed, as a technique for the machine learning, for example, the Fisher's linear discriminant method, a Support Vector Machine (SVM), a decision tree, or a random forest method in consideration of an ensemble average thereof. Hereinafter, a case of employing the decision tree and a case of employing the Fisher's linear discriminant method are described as examples of supervised machine learning.

Figure 7A:
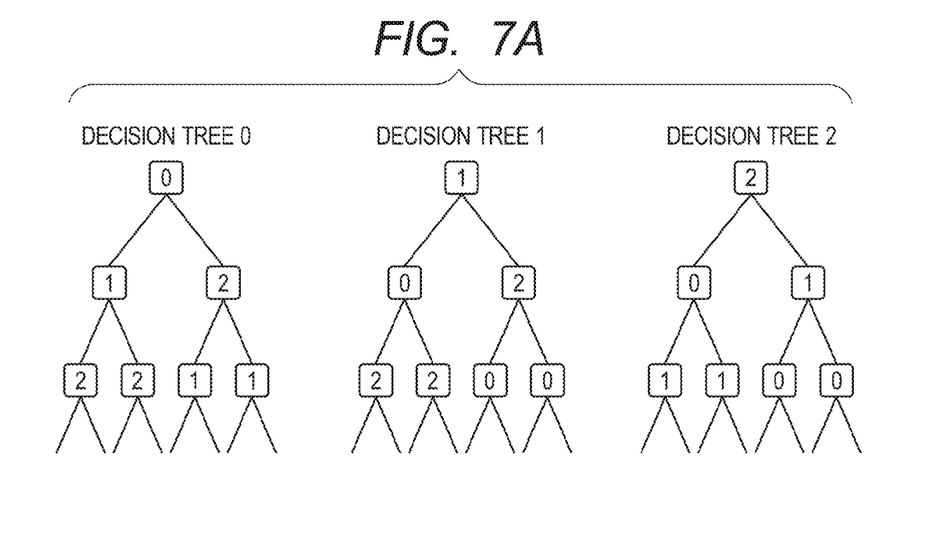
FIGS. 7A and 7B are schematic diagrams of decision tree algorithms.
Figure 7B:
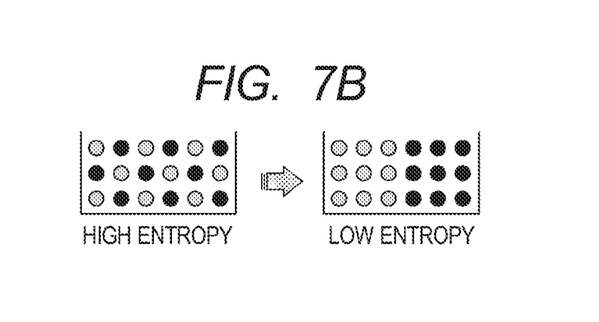

FIG. 7A and FIG. 7B illustrate a process for counting appearance frequencies of typical specific spectra by decision tree algorithms. The presence and absence of a certain peak component can be expressed by 1 and 0, respectively, and hence the presence and absence of a plurality of peak components can be expressed by a decision tree including hierarchical binary trees (in this case, the number of peaks to be used equals the number of hierarchies). As used herein, the binary tree refers to data expressed in a branched structure. Respective spectra to be learned are accompanied by identification numbers (labels) for biological tissues, such as 1 for a cancer tissue and 0 for a normal tissue, as supervisory data. In the case of expressing measured spectrum data by the decision tree, a selection of a peak component to be first expressed is an important issue (FIG. 7A). In this case, since its purpose is efficient classification into the same label, entropy is recursively evaluated and such a decision tree that can reduce entropy most efficiently is finally determined (FIG. 7B). In this connection, the entropy is defined by Expression (3), and a decrease in the entropy corresponds to the classification of a set of mixed data accompanied by different labels into a set of data accompanied by the same label. In Expression (3), i means a node number of a branch portion of a decision tree, and p means a partition probability (at each node, percentages of respective labels).

$$-\sum_{i=0}^{n} \{p(0|i)\log p(0|i) + p(1|i)\log p(1|i)\} \qquad \text{Expression (3)}$$

Figure 8A:
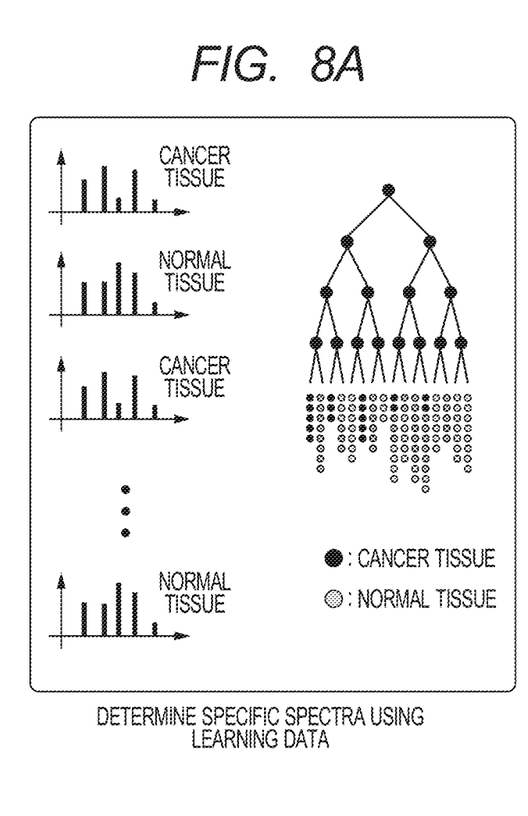
FIGS. 8A and 8B schematically illustrate a series of processes of the present invention.
Figure 8B:
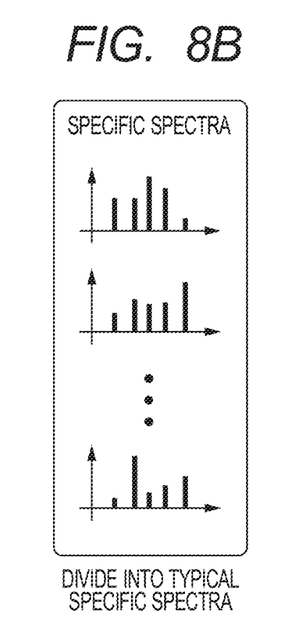
Figure 9:
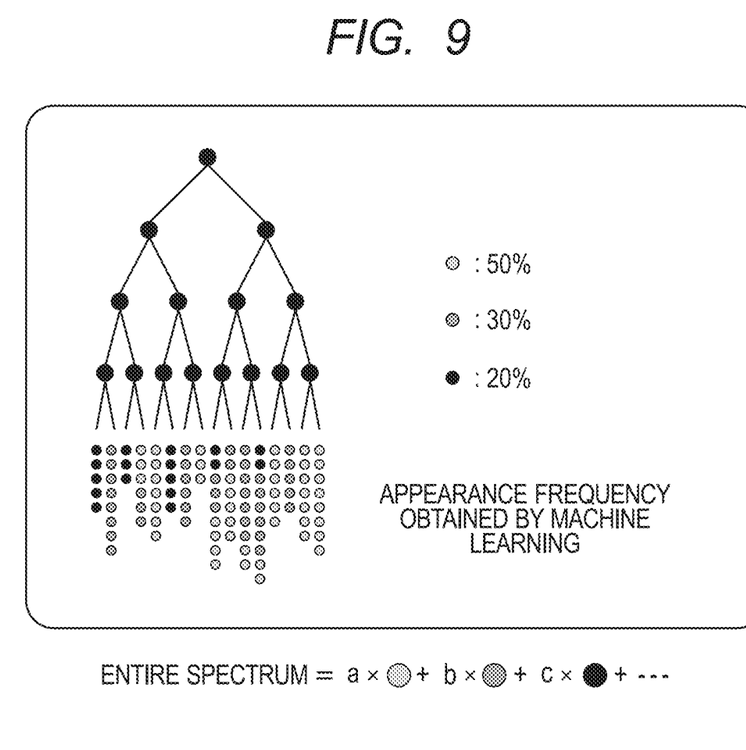
FIG. 9 schematically illustrates the appearance frequency counting of specific spectra.

FIG. 8A and FIG. 8B schematically illustrate the series of processes illustrated in the flowcharts of FIGS. 3 and 6. In FIG. 8A, the appearance frequencies of typical specific spectra are counted by machine learning. In FIG. 8B, based on the appearance frequencies, the measured signals are divided into respective typical specific spectra. It should be noted that when peak components common to the respective typical specific spectra are present, the peak components are separately handled as common peaks. Further, the respective typical specific spectra and common peaks are standardized so as to achieve a norm (inner product) of 1. Further, FIG. 9 schematically illustrates the division into specific spectra according to the order of the appearance frequencies. As described above, the appearance frequencies are counted from training data to determine typical specific spectra, and hence the typical specific spectra can be utilized as reference data.

Figure 10A:
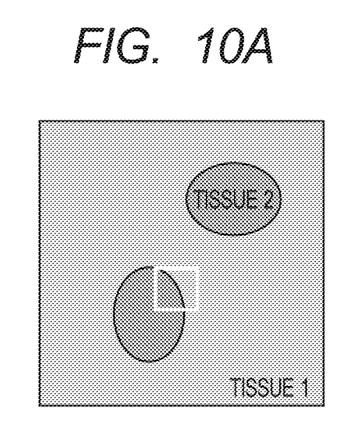
FIGS. 10A, 10B, and 10C schematically illustrate a process for applying the Fisher's linear discriminant method.
Figure 10B:
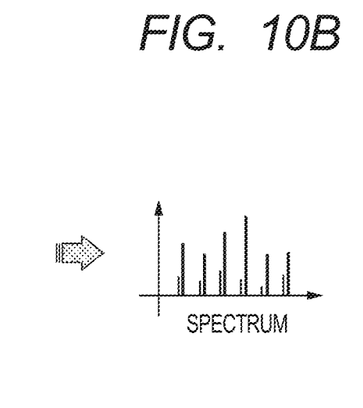
Figure 10C:
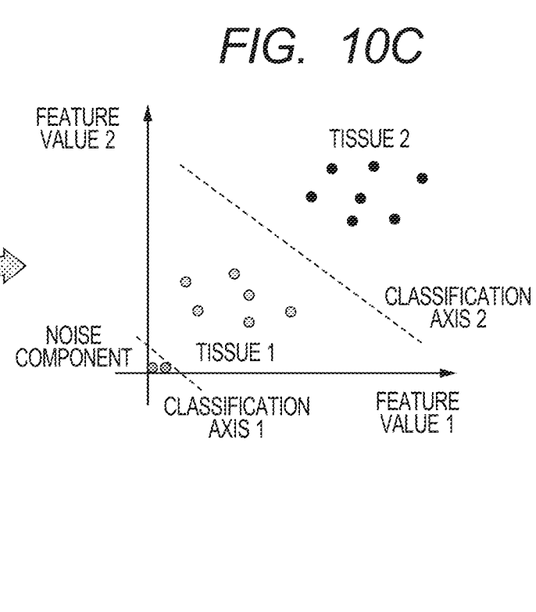

FIG. 10A, FIG. 10B, and FIG. 10C illustrate a process for separating typical specific spectra from the entire measured spectrum data by the Fisher's linear discriminant method. The region in the white frame of FIG. 10A represents a region from which measured spectrum data to be used as training data is acquired. FIG. 10B is a schematic diagram of the measured spectrum data to be used. Respective spectra to be learned are accompanied by identification numbers (labels) for the measured spectrum data, such as 1 for a cancer tissue, 0 for a normal tissue, and 2 for noise components, as supervisory data. FIG. 10C schematically illustrates the state of projecting feature values acquired from the measured spectrum data onto a feature space (classification space) and determining an optimum borderline by the Fisher's linear discriminant method. In this case, a standardized peak intensity or the like can be considered as the feature value. The Fisher's linear discriminant method involves determining such an axis as to maximize a ratio between the between-group variance and within-group variance of a projection component with respect to the axis, and such axis is given by Expression (4), for example, when two groups including group 1 and group 2 are considered. In Expression (4), x represents a coordinate in a feature space, and the position at which the sign of H(x) changes is a border for distinguishing both the groups from each other. Vectors $x_1$ and $x_2$ in Expression (4) mean sample mean vectors of the respective groups (Expression (6)), and matrices $S_1$ and $S_2$ in Expression (5) mean sample variance covariance matrices of the respective groups (Expression (7)) (expressions in the case where the feature space is two-dimensional). $n_1$ and $n_2$ represent the numbers of data in the respective groups.

$$h(x) = (\bar{x}_1 - \bar{x}_2)^T S^{-1} x - \frac{1}{2}(\bar{x}_1 - \bar{x}_2)^T S^{-1}(\bar{x}_1 + \bar{x}_2) \qquad \text{Expression (4)}$$

-continued $$S = \frac{1}{n_1 + n_2 - 2}\{(n_1 - 1)S_1 + (n_2 - 1)S_2\} \quad \text{Expression (5)}$$

$$\bar{x}_1 = \begin{pmatrix} \bar{x}_1^{(1)} \\ \bar{x}_2^{(1)} \end{pmatrix} \quad \bar{x}_2 = \begin{pmatrix} \bar{x}_1^{(2)} \\ \bar{x}_2^{(2)} \end{pmatrix} \quad \text{Expression (6)}$$

$$S_1 = \begin{pmatrix} s_{11}^{(1)} & s_{12}^{(1)} \\ s_{21}^{(1)} & s_{22}^{(1)} \end{pmatrix} \quad S_2 = \begin{pmatrix} s_{11}^{(2)} & s_{12}^{(2)} \\ s_{21}^{(2)} & s_{22}^{(2)} \end{pmatrix} \quad \text{Expression (7)}$$

It should be noted that in FIG. 10C, an classification axis 1 is an axis for separating a biological tissue 1 from noise components, and an classification axis 2 is an axis for separating a biological tissue 2 from the biological tissue 1. The classification axis 1 can separate spectra specific for a biological tissue from the noise components.

The division into typical specific spectra and common spectra not only can suitably reduce noise except original biological tissue components but also can compress information. In this case, only a spectrum component having a high appearance frequency is held by setting the contribution of a spectrum having a volume equal to or less than a certain value to zero in a spectrum or feature space having a frequency equal to or less than a certain value. The information compression processing is particularly effective in the case of storing a large quantity of measured spectrum data.

Figure 1:
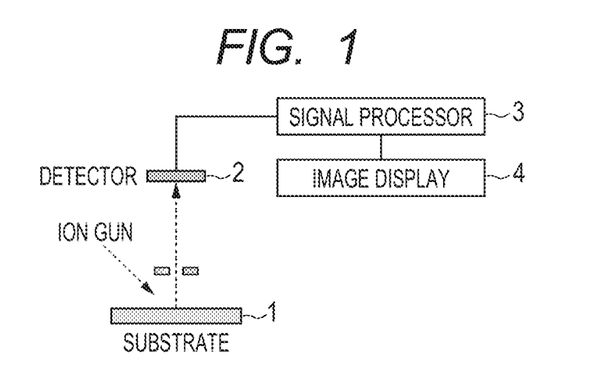
FIG. 1 is a schematic diagram of an apparatus according to the present invention.

The present invention can be realized by an apparatus that implements the above-mentioned specific embodiment. FIG. 1 illustrates the configuration of the entire apparatus according to the present invention. A sample on a substrate is represented by reference numeral 1, and a signal detector is represented by reference numeral 2. A signal processor for subjecting acquired signals to the above-mentioned processing is represented by reference numeral 3, and an image display for displaying the results of the signal processing on a screen is represented by reference numeral 4.

EXAMPLE 1

Hereinafter, Example 1 of the present invention is described. In this example, through use of a TOF-SIMS 5 type apparatus (trade name) manufactured by ION-TOF GmbH, a tissue section containing an HER2 protein at an expression level of 2+ and subjected to trypsin digestion treatment (manufactured by Pantomics, Inc.) was measured by SIMS under the following conditions.
 Primary ion: 25 kV Bi$^+$, 0.6 pA (pulse current value), macro-raster scan mode
 Primary ion pulse frequency: 5 kHz (200 μs/shot)
 Primary ion pulse width: about 0.8 ns
 Primary ion beam diameter: about 0.8 μm
 Measurement range: 4 mm×4 mm
 Number of pixels used for measuring secondary ion: 256× 256
 Cumulative time: 512 shots per pixel, single scan (about 150 minutes)
 Secondary ion detection mode: positive ion The resultant SIMS data contains XY coordinate information representing a position and a mass spectrum per shot for each measured pixel. For example, for each measured pixel, the SIMS data contains, as measured spectrum data, a peak (m/z=720.35) corresponding to a mass number in which one sodium atom adsorbs to one of the digestion fragments of the HER2 protein, and information on a peak component attributed to each biological tissue.

Figure 11A:
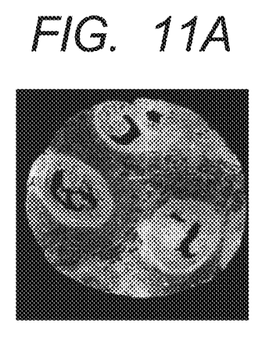
FIGS. 11A, 11B, and 11C are images showing application effects of Example 1 of the present invention.

FIG. 11A shows the result obtained by subjecting the tissue section containing an HER2 protein at an expression level of 2+ (manufactured by Pantomics, Inc.) to immunostaining for the HER2 protein, and observing the tissue section with a light microscope. In FIG. 11A, a portion at which the HER2 protein is expressed at a higher level is displayed brighter. It should be noted that, the sample subjected to the SIMS measurement and the sample subjected to the immunostaining are not the same but are adjacent sections excised from the same lesion tissue (paraffin block).

Figure 11B:
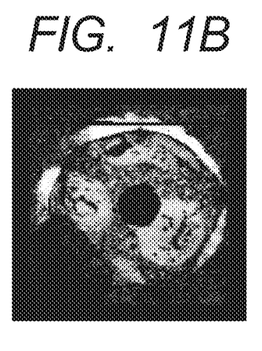
Figure 11C:
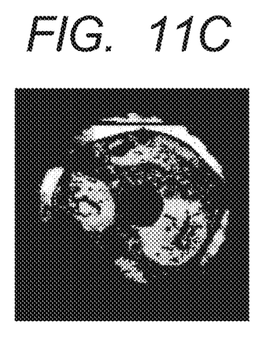

FIG. 11B shows a peak distribution image (m/z=720.35) before the application of the technique of the present invention, and FIG. 11C shows a peak distribution image after the application. Machine learning using a decision tree is used for the preparation of reference data. The image data of FIG. 11A described above is used for the label decision of training data in that case, and 4,096 pieces of data are used as the training data. The number of peaks used for the generation of typical specific spectra is six in total, and m/z values corresponding to the peaks are 692.35, 720.35, 932.63, 1,101.5, 1,128.6, and 1,326.4, respectively, three of which correspond to theoretical values for the digestion fragments.

Figure 12A:
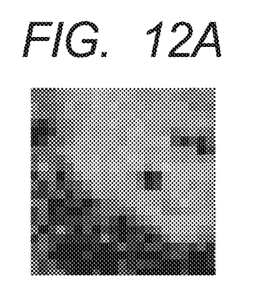
FIGS. 12A and 12B are images (enlarged images) showing the application effects of Example 1 of the present invention.
Figure 12B:
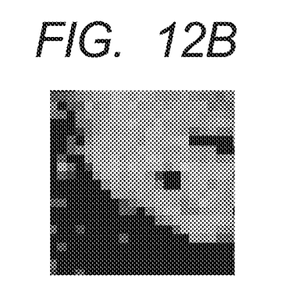

FIG. 12A and FIG. 12B are partially enlarged images of FIG. 11B and FIG. 11C, respectively. FIG. 12A shows an image before the application of this technique, and FIG. 12B shows an image after the application. It is understood that the application of this technique provides reduced noise, an improved image contrast, and a sharper outline.

EXAMPLE 2

Hereinafter, Example 2 of the present invention is described. Although the apparatus conditions and experiment conditions of this example are the same as those in the case of Example 1, the Fisher's linear discriminant method was employed as the technique for machine learning.

Figure 13A:
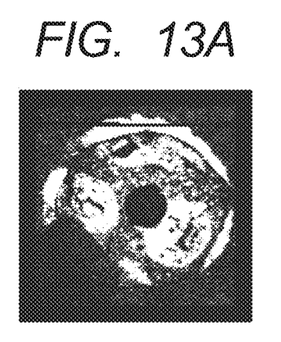
FIGS. 13A and 13B are images showing application effects of Example 2 of the present invention.
Figure 13B:
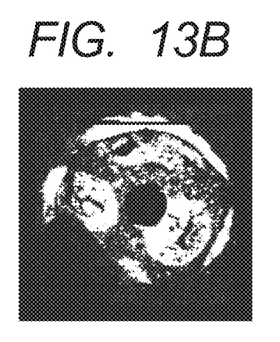

FIG. 13A and FIG. 13B are images showing effects obtained in the case of employing the Fisher's linear discriminant method as the technique for machine learning and applying the technique of the present invention. FIG. 13A shows a peak distribution image (m/z=720.35) before the application of the technique of the present invention, and FIG. 13B shows a peak distribution image after the application. 256 pieces of data are used as training data. The number of peaks used for the machine learning is two in total, and m/z values corresponding to the peaks are 692.35 and 1,101.5, respectively. It is understood that the application of this technique provides reduced noise, an improved image contrast, and a sharper outline.

The present invention can be utilized as a technique for reducing noise in measured spectrum data more effectively.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-016429, filed Jan. 30, 2012, and Japanese Patent Application No. 2013-005347, filed Jan. 16, 2013, which are hereby incorporated by reference herein in their entirety.

What is claimed is:

1. A method of acquiring a biological tissue image, the method comprising the step of:
    reconstructing a biological tissue image having reduced noise through use of a plurality of measured spectrum data obtained by measuring respective regions of a biological tissue,
    wherein the reduction of the noise is performed through use of a technique for machine learning utilizing reference data for the measured spectrum data,
    wherein the reference data is generated through utilization of training data, and
    wherein the reduction of the noise is performed by generating a classifier through utilization of the training data, dividing an entire spectrum into typical specific spectra through use of the classifier, and reconstructing an image from the typical specific spectra derived from the biological tissue.

2. The method according to claim 1, wherein the measured spectrum data is one of data of optical spectrum in a range of ultraviolet, visible or infrared light, Raman spectrum and mass spectrum.

3. An apparatus for reconstructing a biological tissue image comprising a central processing unit and memory, said central processing unit and memory cooperating to execute the method of claim 1.

4. The apparatus according to claim 3, further comprising a detector for detecting a signal from a sample on a substrate, and an image displaying member for displaying the reconstructed image.

5. The apparatus according to claim 4, wherein the detector obtains a two-dimensional mass spectrum.

6. The method according to claim 1, wherein the technique for machine learning is selected from the group consisting of the Fisher's linear discriminant method, a Support Vector Machine (SVM), a decision tree, and a random forest method.

7. The method according to claim 1, further comprising a step where components other than the typical specific spectra are expressed by 0 with respect to the measured spectrum data.

8. The method according to claim 2, wherein the measured spectrum data is a two-dimensional mass spectrum which utilizes a mass number (m/z) and a strength data corresponding to the peak of the mass spectrum.

* * * * *